United States Patent

Wode

Patent Number: 5,669,418
Date of Patent: Sep. 23, 1997

[54] AIR CHECK VALVE FOR AN AIR SPRING

[75] Inventor: Stefan Wode, Hannover, Germany

[73] Assignee: Continental Aktiengesellschaft, Hannover, Germany

[21] Appl. No.: 685,828

[22] Filed: Jul. 25, 1996

[30] Foreign Application Priority Data

Jul. 29, 1995 [DE] Germany .......... 195 27 937.9

[51] Int. Cl.⁶ .......... F16K 15/14
[52] U.S. Cl. .......... 137/859; 267/64.11
[58] Field of Search .......... 137/859; 267/64.11, 267/64.28

[56] References Cited

FOREIGN PATENT DOCUMENTS 0474171 3/1992 European Pat. Off. .
3103952 8/1982 Germany .

Primary Examiner—Denise L. Ferensic
Assistant Examiner—Ramyar M. Farid
Attorney, Agent, or Firm—Walter Ottesen

[57] ABSTRACT

The invention is directed to a check valve for an air spring which has a supply line through which air is supplied. Even after the supply line is disconnected, the pressure in the air spring should not drop below a certain minimum pressure. When refilling and during storage, a defined position of the flexible member should be provided. The air check valve 4 includes a valve body 8, a valve housing 6 and an elastic valve plate 10. The valve body 8 functions as a base plate and has a concentric ring-shaped sealing edge 24 to impart bending stress to the elastic valve plate 10. The valve body has a bore 30 disposed outside of the ring edge 24. The valve housing 6 has a ring-shaped depression 32 corresponding to the ring edge 24. The valve plate 10 has a center bore 22 which communicates with an air connection 28 via a channel 26 disposed in the valve housing. The peripheral portion of the elastic valve plate 10 is clamped between profiles (18, 20) of the valve body 8 and the valve housing 6. The air check valve can be used in all types of vehicle air springs.

7 Claims, 1 Drawing Sheet

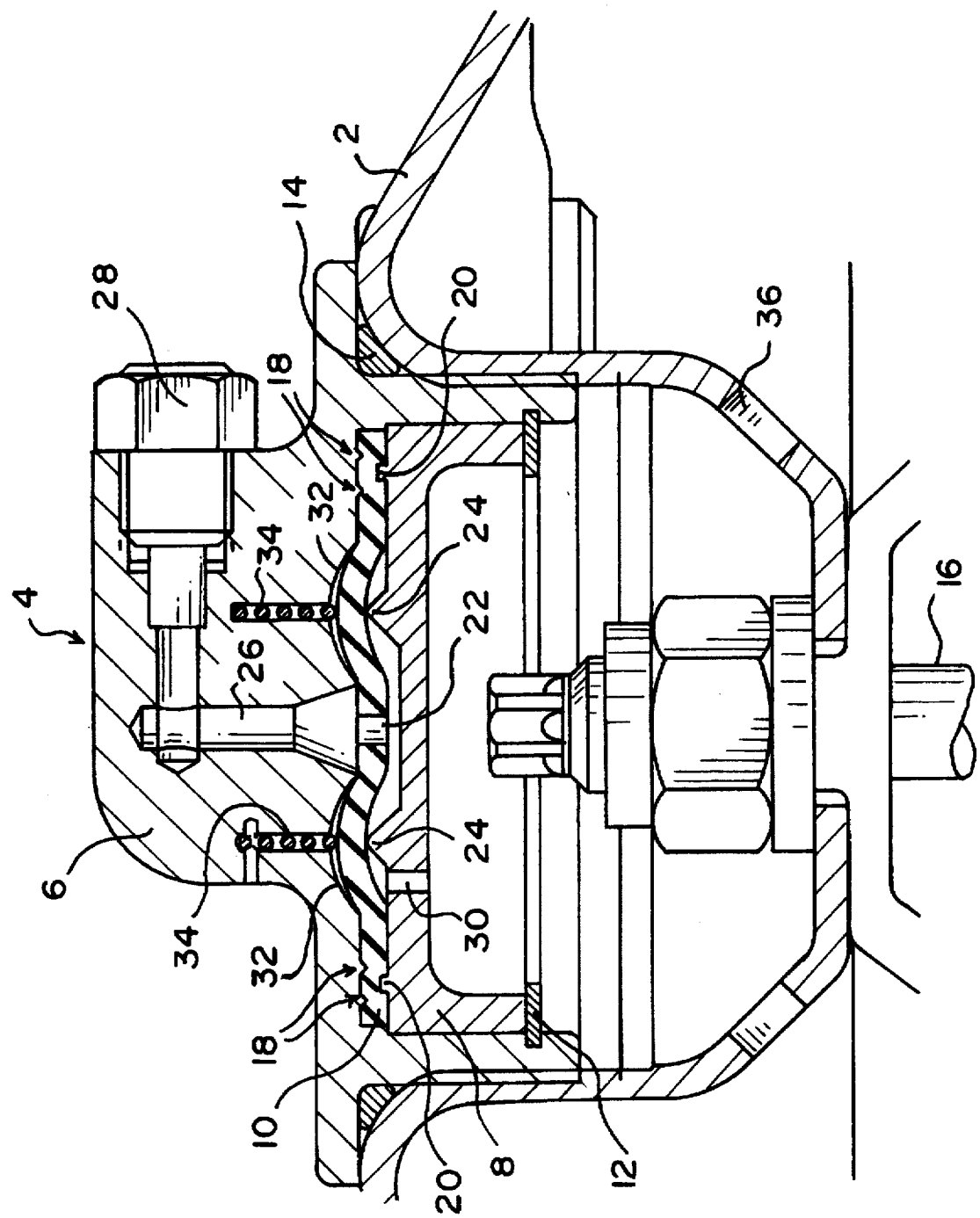

AIR CHECK VALVE FOR AN AIR SPRING

FIELD OF THE INVENTION

The invention relates to an air check valve for a vehicle air spring. This check valve is a so-called residual-pressure holding valve.

BACKGROUND OF THE INVENTION

The purpose of such a residual-pressure holding valve is to always preclude a pressureless roll off of the flexible member of the air spring. It is especially desirable during longer periods of standstill to prevent the preassembled flexible member of the air spring from rolling off on the roll-off piston without pressure within the air spring.

German patent publication 3,103,952 discloses an arrangement for filling vibration dampers with pressurized gas. In this publication, the suggestion is made that a fill opening accommodates an axially movable valve body while forming an annular space. The valve body has a sealing ring which is in contact engagement with the inner surface of an outer tube and has an end portion which extends out from the outer tube. The sealing ring is pretensioned over the valve cone and the end portion carries a holding ring.

This valve permits a subsequent refilling in the event that the vibration damper somehow loses pressurized gas. Fixing the valve between an O-ring and a holding ring is, however, not so configured that a frequent refilling is possible with this arrangement.

European patent publication 0,474,171 discloses an air check valve for separating two pressure compartments of a multi-stage air spring. This valve includes especially a valve disc, a cylinder having a piston, a piston rod and a pressure spring. The valve operates in that it closes at a pregiven overpressure and opens when there is a drop below the overpressure as well as when utilizing a control pressure. This valve is relatively expensive and complicated because of this double function.

SUMMARY OF THE INVENTION

It is an object of the invention to provide a residual-pressure holding valve which avoids the above-mentioned defects and disadvantages and ensures that there will not be a drop below a certain minimum pressure in the air spring even after the supply line is removed (0.5 bar needed for forming the rolling lobe). It is a further object of the invention to provide such an air check valve which is simple with respect to its assembly and manufacture and nonetheless provides excellent reliability with respect to the occurrence of breakdowns.

The air check valve of the invention is for an air spring of a vehicle and includes: a valve housing having a first surface; a valve body having a second surface; the valve body being mounted in the valve housing so as to cause the first and second surfaces to conjointly define a valve chamber and an interface extending peripherally around the chamber; an elastic valve plate having a mid portion and a peripheral portion and being clamped at the peripheral portion between the valve housing and valve body at the interface thereby placing the mid portion in the chamber; profile means formed at the interface for more securely holding the elastic valve plate between the valve housing and the valve body; the valve body having a concentric ring edge formed on the second surface within the chamber to partition the second surface into an inner surface region within the concentric ring and an outer surface region outside of the concentric ring; the elastic valve plate having a central bore communicating with a first compartment formed between the mid portion of the elastic plate and the inner surface region; the valve body having a passage formed therein at the outer surface region so as to connect the interior of the air spring to a second compartment formed between the mid portion of the elastic plate and the outer surface region; the valve housing having an air connection for receiving pressurized air and having a channel formed therein for conducting the pressurized air from the air connection into the chamber and through the central bore into the first compartment; and, the elastic plate being movable between a first position wherein the mid portion is in contact engagement with the ring edge and a second position wherein the mid portion is in spaced relationship to the ring edge thereby permitting pressurized air passing through the control bore to pass from the first compartment to the second compartment and through the passage into the interior of the air spring.

The air check valve of the invention is defined by a very simple two-part construction (for example, as a plastic snap part or pressed metal part). Accordingly, it is considerably less expensive than comparable solutions. The valve can be utilized as a closure plug for an air spring damping unit. A thread can be formed on the periphery of the valve.

The air check valve is advantageously utilized in all kinds of air springs wherein an inner pressure may not drop below a specific level.

A defined holding pressure is always given with the air check valve. In this way, it is ensured that the rolling lobe of the flexible member of the air spring cannot collapse and therefore will not be damaged by "pressureless" compression.

Depending upon the elevation of the annular edge and the sequence of assembly (first building in the valve plate and then building in the annular edge or vice versa), the valve plate is subjected to load more by bending stresses or more by radial tension stresses. The switching characteristic and the deterioration characteristic of the embodiment is dependent thereon.

A compression spring improves the deterioration characteristics in the event that the elastomer has a pressure-deformation set which is too high. The pressure spring is mounted on the side lying opposite the annular edge and in the valve housing and presses the valve plate against the annular edge.

BRIEF DESCRIPTION OF THE DRAWING

The invention will now be described with reference to the single FIGURE of the drawing which shows an air check valve according to an embodiment of invention.

DESCRIPTION OF THE PREFERRED EMBODIMENTS OF THE INVENTION

The drawing shows an air check valve 4 mounted on a cover 2 of an air spring on which, for example, the flexible member (not shown) of the air spring is mounted. This air check valve 4 includes essentially a valve housing 6, a valve body 8 and a valve plate 10 clamped between the valve housing 6 and the valve body 8. The valve body 8 is held in its position by means of a fixing ring 12. The valve housing 6 is fixedly attached to the air spring cover 2 with threaded fasteners (not shown). An O-ring 14 is placed between the air spring cover 2 and the valve housing 6 and ensures that the required seal tightness is provided.

The air spring cover 2 simultaneously functions as an attachment part for a shock absorber piston rod 16.

The valve body 8 as well as the valve housing 6 have profiles (18, 20) in the region of the outer periphery of the valve plate 10. These profiles are provided to more tightly fix and air-tightly seal the valve plate 10 clamped therebetween.

The valve plate 10 is a planar, relatively flexurally stiff, punched rubber membrane which has a center bore 22 and is stretched over a ring-shaped edge 24. The center bore 22 of the valve plate 10 communicates via a channel 26 with an external air connection 28. The air connection 28 is not shown in section so that the feed channel extending therethrough is shown in the drawing.

The valve body 8 has a substantially planar surface on which the concentric annular or ring-shaped edge 24 is located. This edge 24 functions as a sealing edge. The planar surface extending within the ring edge 24 can be lower, at the same elevation or higher than the planar surface outside of the ring edge 24.

In a further embodiment, this ring edge 24 is subsequently built into the valve body 8 and/or can be adjusted in elevation. The valve body 8 has a bore 30 between ring edge 24 and the profiled outer peripheral edge portion.

On the side of the valve housing 6 lying opposite the sealing edge 24, the valve housing has a ring-shaped depression 32 for accommodating the valve plate 10 which is deflected out of the planar form by the ring edge 24. A compression spring (helical spring) 34 can be installed in the valve housing 6 for the purpose of holding down the valve plate 10. This is then for the case that the valve plate 10 exhibits a pressure deformation set which is too high. The valve plate 10 is made of elastomeric material.

If an overpressure applied to the air connection 28 exceeds a certain minimum level, then the valve plate 10 lifts from the ring edge 24 and permits a free flowthrough of the air from the region within the ring edge 24 to the region outside of the ring edge and from there, the air flows further through the bore 30 and bores 36 into the interior space of the air spring to build up pressure in the air spring.

The radial location of the ring-shaped peripherally extending sealing edge 24 influences the switching characteristic of the valve 4. If the sealing edge 24 is far out, then the force acting on the valve plate 10 outside of this edge 24 influences the membrane stroke much less than the force within the edge 24. The pressure outside of the edge 24 corresponds to the internal pressure of the air spring and the air pressure within the edge 24 corresponds to the air pressure of the supply line 26 when the valve 4 is closed.

If there is a rupture of the feed line (not shown) connected to air connection 28, then the valve 4 closes even before the pressure in the air spring has reached so low a level as that of the ruptured feed line. This assumes that the gap between the valve plate 10 and the seal edge 24 throttles sufficiently. In this way, an emergency operation is guaranteed. In contrast, for a slower removal of air, the air spring pressure has time to adapt to the feed line pressure and therefore can be lowered below this emergency level.

In this way, an emergency function as well as a lowering of the unloaded vehicle is made possible notwithstanding driving at high speeds as on an expressway.

It is understood that the foregoing description is that of the preferred embodiments of the invention and that various changes and modifications may be made thereto without departing from the spirit and scope of the invention as defined in the appended claims.

What is claimed is:

1. An air check valve for an air spring of a vehicle, the air check valve comprising:

a valve housing having a first surface;

a valve body having a second surface;

said valve body being mounted in said valve housing so as to cause said first and second surfaces to conjointly define a valve chamber and an interface extending peripherally around said chamber;

an elastic valve plate having a mid portion and a peripheral portion and being clamped at said peripheral portion between said valve housing and valve body at said interface thereby placing said mid portion in said chamber;

profile means formed at said interface for more securely holding said elastic valve plate between said valve housing and said valve body;

said valve body having a concentric ring edge formed on said second surface within said chamber to partition said second surface into an inner surface region within said concentric ring and an outer surface region outside of said concentric ring;

said elastic valve plate having a central bore communicating with a first compartment formed between said mid portion of said elastic plate and said inner surface region;

said valve body having a passage formed therein at said outer surface region so as to connect the interior of the air spring to a second compartment formed between said mid portion of said elastic plate and said outer surface region;

said valve housing having an air connection for receiving pressurized air and having a channel formed therein for conducting the pressurized air from said air connection into said chamber and through said central bore into said first compartment; and, said elastic plate being movable between a first position wherein said mid portion is in contact engagement with said ring edge and a second position wherein said mid portion is in spaced relationship to said ring edge thereby permitting pressurized air passing through said control bore to pass from said first compartment to said second compartment and through said passage into the interior of the air spring.

2. The air check valve of claim 1, said valve housing having a depression formed in said first surface corresponding to said ring edge.

3. The air check valve of claim 1, said elastic valve plate being pretensioned in radial direction.

4. The air check valve of claim 1, said elastic valve plate being punched out of an elastomer.

5. The air check valve of claim 1, said ring edge being adjustable in elevation.

6. The air check valve of claim 1, said mid portion of said elastic valve plate being at an elevation different than said peripheral portion thereof.

7. The air check valve of claim 1, further comprising a compression spring mounted in said valve housing so as to extend beyond said first surface and press said elastic valve plate against said ring edge.

* * * * *